United States Patent [19]

Dietrich

[11] Patent Number: 4,626,151

[45] Date of Patent: Dec. 2, 1986

[54] TOOL ALIGNMENT GAUGE

[76] Inventor: Robert F. Dietrich, R.D. #2 Box 367, Johnstown, Pa. 15904

[21] Appl. No.: 671,362

[22] Filed: Nov. 14, 1984

[51] Int. Cl.⁴ .............................................. B23C 1/12
[52] U.S. Cl. ................................ 409/210; 409/214; 409/218; 33/185 R
[58] Field of Search ............... 409/210, 211, 214, 218, 409/204, 205, 206; 33/185 R, 172 D, 169 C, 201, 203.19

[56] References Cited

U.S. PATENT DOCUMENTS

| 1,415,182 | 3/1922 | Lloyd | 33/185 R |
| 1,553,878 | 9/1925 | Romig | 33/201 |
| 2,029,665 | 2/1936 | Markowicz | 33/185 R |
| 2,674,045 | 4/1954 | Lakomski | 33/185 R |

Primary Examiner—Donald R. Schran
Assistant Examiner—James L. Wolfe
Attorney, Agent, or Firm—Fidelman, Wolffe & Waldron

[57] ABSTRACT

A gauge is mountable upon the tailstock of a horizontal milling machine with one end of a pivotal angle arm engageable with a cutting tool and the other end thereof cooperating with calibrations on the base of the gauge to indicate alignment or misalignment of a cutter plane and a work plane so that proper alignment thereof may be effected by use of the device.

2 Claims, 8 Drawing Figures

TOOL ALIGNMENT GAUGE

CROSS REFERENCES TO THE PRIOR ART

U.S. Pat. No. 811,244—Peterson—INDICATOR FOR LATHES, issued Jan. 30, 1906.

U.S. Pat. No. 1,415,182—Lloyd—CHASER ADJUSTING TOOL, issued May 9, 1922.

U.S. Pat. No. 3,802,084—Fortado, Jr.—INDICATING DEVICE, Jr., issued Apr. 9, 1974.

BACKGROUND AND SUMMARY OF THE INVENTION

The invention is directed to a device for determining whether or not a workpiece and a cutter of a horizontal milling machine or lathe are located or aligned accurately relative to each other and, if not, to what extent they are out of alignment. In particular, a fixed gauge block and pivotal angle arm are mountable on a work support or holder of a horizontal milling machine so that after an "eyeballed" rough alignment of a cutter centering plane, hereinafter referred to as a "cutter plane", with a work aligning plane, hereinafter called a "work plane", accurate alignment of the cutter and work planes is facilitated by engaging one end of the angle arm with the cutter so that the other end of the angle arm cooperates with a scale indicating an amount of misalignment.

The above cross-referenced patents each disclose a pivotal indicator arm, but none function in the manner or for the purpose of the instant invention device. Of these, the Peterson device is an indicator that is mounted in a tool-post in replacement of a tool so as to have one end thereof in engagement with a workpiece in order to move in response to variations in the work surface during work rotation and thus indicate "trueness" or the lack thereof. The Lloyd indicator is for setting the depth of cut of a fixed tool into rotatable work, while the Fortado, Jr., device is attached to a height gage or the like with the pivotal arm thereof engageable in a hole of an adjacent panel in order to indicate the height of the center of the hole relative to a datum line.

DETAILED DESCRIPTION OF THE INVENTION

Figure 1:
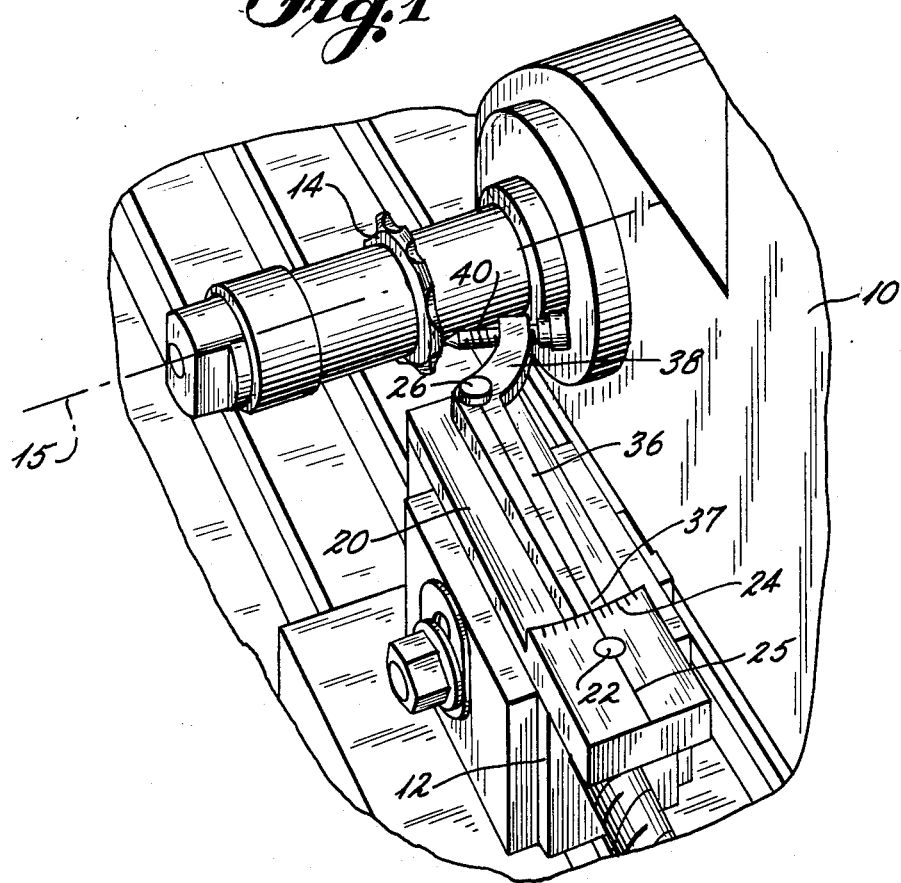
FIG. 1 is a top right side isometric view illustrating the indicator device mounted for use on horizontal milling machine.
Figure 2:
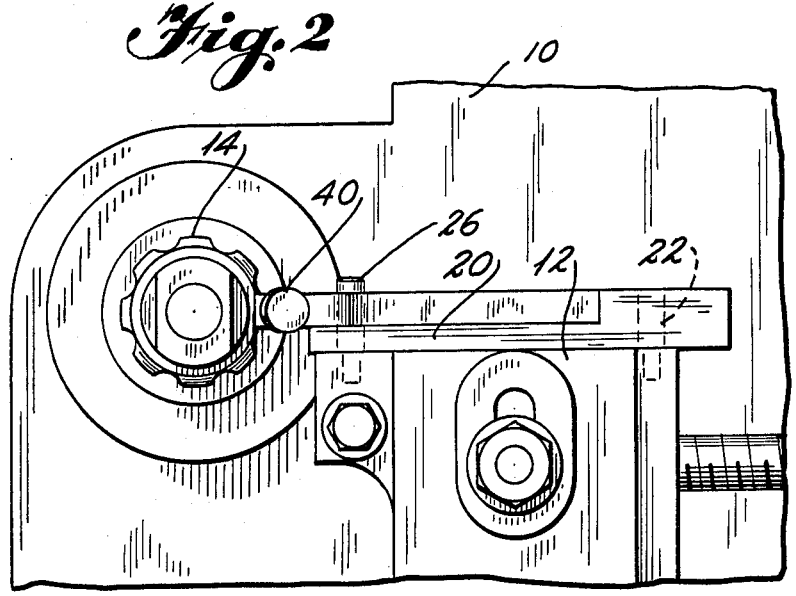
FIG. 2 is a front elevation of the device of FIG. 1.

Referring to FIG. 1, horizontal milling machine 10 has an indexing tailstock 12 for supporting one end of a workpiece (not shown) in the usual manner, and a cutting tool 14 which is rotatable about axis 15 for machining the workpiece. A cutter centering plane, generally perpendicular to axis 15 is definable by cutting edges of tool 14. Such a cutter plane, when properly set up for machining a workpiece, is generally coplaner with a work plane. In order to accomplish accurate aligning of the work and cutter planes in a repeatable, simple manner, the aligning tool of the instant invention has been provided.

Figure 3:
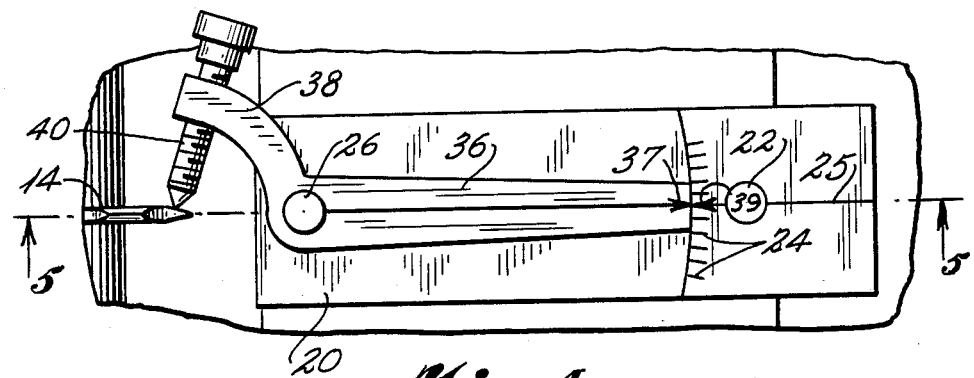
FIGS. 3 and 4 are top plan views of the device of FIG. 2, and illustrate reversable mounting of the pivotal angle arm.
Figure 4:
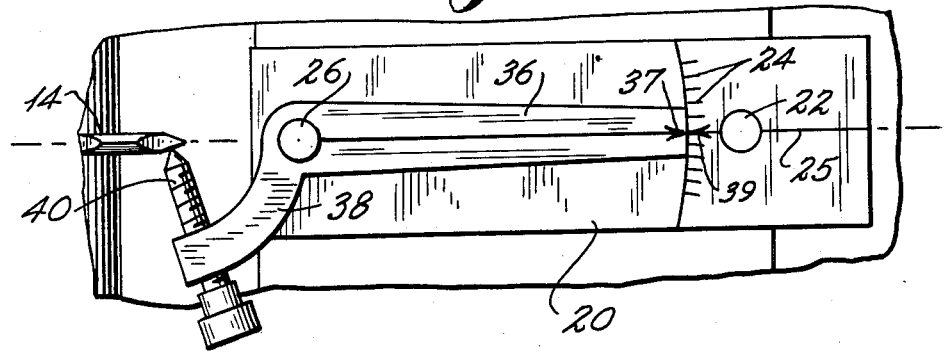
Figure 5:
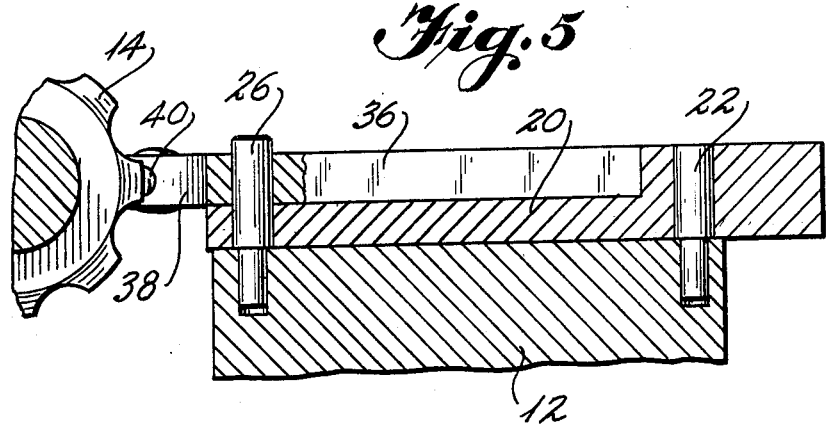
FIG. 5 is a cross-section, as generally viewed in the direction of arrows 5—5 of FIG. 3.

The aligning tool comprises a base member 20 which is attached to tailstock 12 by dowel pins 22, 26 in such a manner as to align an indicator mark 25 on base 20 with the work plane. Dowel pin 26, as seen in FIG. 5, also acts as a pivot point for an angle arm of the gauge. The angle arm has a long portion 36 and a short portion 38 and is removable from dowel 26 such that it is reorientable to either of the positions shown in FIGS. 3 and 4. The longer portion 36 of the angle arm is provided with an indicator arrow 37 for alignment with a corresponding indicator arrow 39 on base portion 20. A preferred embodiment also includes measuring graduations 24 on base 20. The short portion 38 of the angle arm receives a threaded rod 40 which, in use, is engageable with cutting tool 14.

In a prototype of the invention, the dimensions of the device were such that shifting of the cutting tool along axis 15 by 0.025 inches reflected approximately 0.0625 inches of arcuate displacement between the arrows 37, 39.

Figure 6:
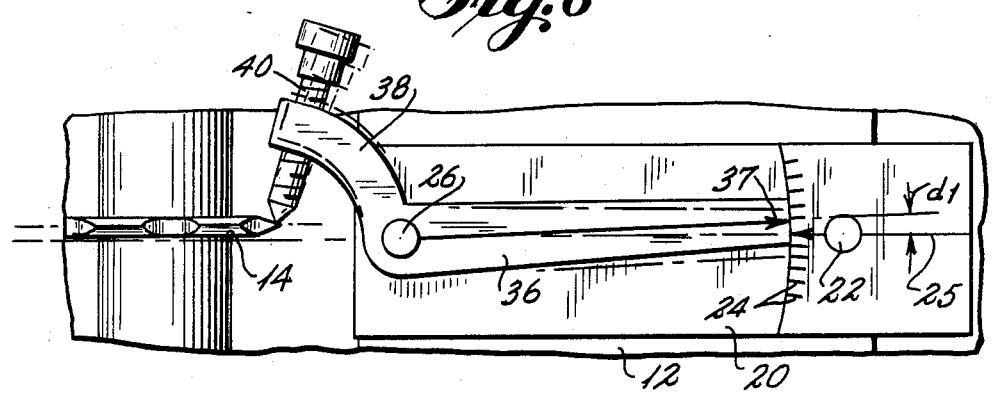
FIGS. 6-8 are top plan views illustrating use of the device.
Figure 7:
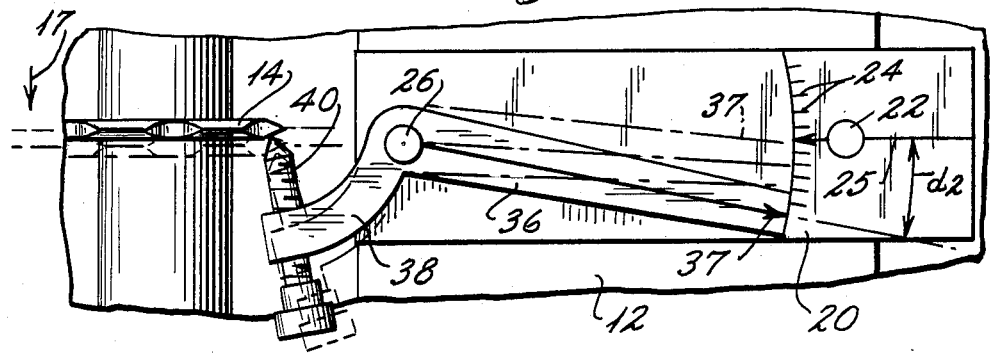
Figure 8:
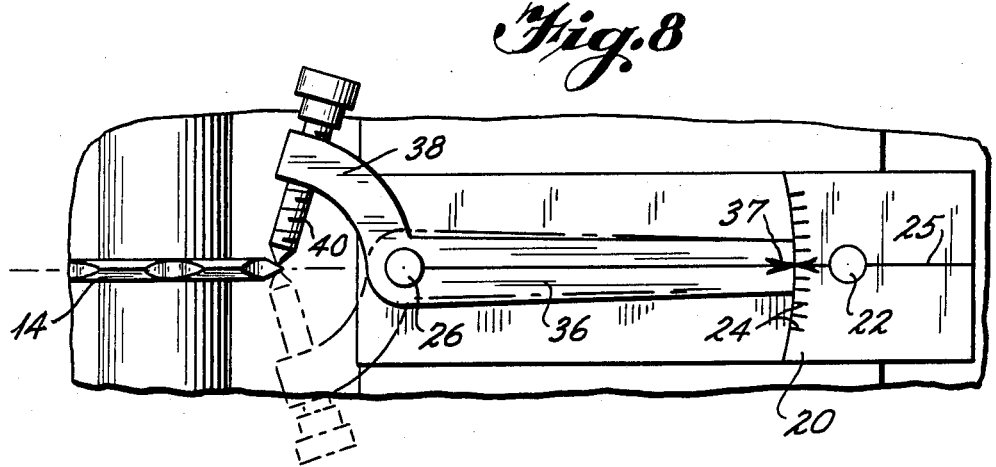

Use of th device may be better understood by reference to FIGS. 6-8. In FIG. 6, cutting tool 14 has been "eyeball aligned" and the angle arm has been pivoted counter clockwise about dowell 26 to engage cutting tool 14 with threaded rod 40. As also seen in FIG. 6, the arrow 37 of the angle arm is out of alignment with the corresponding arrow 39 of support block 20 by an amount "$d_1$". Adjustment of threaded rod 40 while keeping the tip thereof in engagement with cutting tool 14 allows pivoting of the angle arm clockwise to align arrow 37 with arrow 39, as indicated by the phantom lines in FIG. 6, thus completing initial set-up of the gauge.

Next, the angle arm is repositioned on pivot dowel 26, in the orientation of FIG. 7, and pivoted clockwise to engage threaded rod 40 with cutting tool 14, as indicated in the solid lines of FIG. 7. As seen in FIG. 7, distance "$d_2$" is indicative of an amount that cutting tool 14 must be shifted along its support axis 15 for alignment of the work and cutting planes. For instance, movement of cutting tool 14 by an amount equal to one half the distance "$d_2$" is a good approximation of the displacement needed in order to perform the alignment.

Having moved cutting tool 14 to the phantom line position, as indicated by arrow 17 (FIG. 7) and with the angle arm oriented as in FIG. 7, the tip of rod 40 is engaged with tool 14. If there is any remaining misalignment, as indicated by arrows 37 and 39, then rod 40 is adjusted to align the arrows 37, 39. Next, the pivotal angle arm is removed and inverted to engage threaded rod 40 with the other side of cutting tool 14 again. If needed, cutting tool 14 then is shifted again along its support axis by an amount equal to one half the distance indicated by misalignment of arrows 37 and 29.

Thereafter, such steps are repeated until positioning of the angle arm as in FIG. 8 is achieved, so that no additional adjustment of threaded rod 40 is required in order for arrow 37 of the angle arm to align with arrow 39 when the angle arm is reoriented by flipping back and forth as described above.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. In a milling machine having a work support with means for defining a work plane and a cutter with means for defining a cutter plane moveable relative to said work support, said work and cutter planes being generally parallel to and spaced from each other when misaligned, the improvement comprising:

means for indicating alignment and misalignment of said tool and work planes in order to facilitate aligning of said planes substantially coplanarly, and comprising:

a base mountable on said work support so as to position a fixed indicator relative to said work plane;

a pivotal angle-arm having means for reversibly mounting said angle arm on said base in order to position, alternately, opposite sides of said angle-arm immediately adjacent said base, said angle-arm having a short leg having a threaded rod engageable with said cutter and a long leg defining a moveable indicator alignable with said fixed indicator, said short leg being engageable with said cutter via said threaded rod during checking of said alignment and misalignment;

whereby, with said work and cutter planes nonaligned and said angle-arm pivotally mounted on said base with said fixed indicator aligned with said work plane, said short arm of said angle-arm is engageable with said cutter so that nonalignment of said fixed and moveable indicators is indicative of misalignment of said work and cutter planes and so that, by turning said threaded rod, said angle-arm is pivotally adjustable to align said indicators while said threaded rod still engages said cutter, such that an arcuate distance of movement of a tip of said moveable indicator to effect said alignment of indicators is proportional to a distance of movement required of said cutter and cutter plane relative to said work plane in order to align said work and cutter planes.

2. The improvement of claim 1, wherein said fixed indicator comprises:

measurement graduations indicative of said distance of movement required of said cutter plane.

* * * * *